United States Patent [19]

Kurotori et al.

[11] 4,415,533
[45] Nov. 15, 1983

[54] PROCESS FOR TREATING EXHAUST GAS FROM ELECTROPHOTOGRAPHIC MACHINE AND APPARATUS THEREOF

[75] Inventors: Tsuneo Kurotori, Tokyo; Manabu Mochizuki, Yokohama; Susumu Tatsumi, Hino, all of Japan

[73] Assignee: Ricoh Co., Ltd., Tokyo, Japan

[21] Appl. No.: 270,320

[22] Filed: Jun. 4, 1981

[30] Foreign Application Priority Data

Jun. 18, 1980 [JP] Japan .................. 55-83374

[51] Int. Cl.³ .............................................. A61L 9/00
[52] U.S. Cl. .......................................... 422/4; 55/74;
55/388; 118/262; 118/642; 118/661; 355/10;
355/16; 422/5; 422/122; 422/174; 422/199;
430/32
[58] Field of Search ................ 422/4, 5, 122, 173,
422/174, 198, 199; 355/10, 16; 118/262, 642,
661; 55/388, 74; 430/32

[56] References Cited

U.S. PATENT DOCUMENTS

| | | | |
|---|---|---|---|
| 2,940,835 | 6/1960 | Scofield | 422/174 X |
| 2,988,432 | 6/1961 | Long | 422/122 |
| 3,006,042 | 10/1961 | Calandra | 422/174 |
| 3,130,079 | 4/1964 | Von Meister | 118/661 |
| 3,299,620 | 1/1967 | Hollingworth | 422/122 X |
| 3,468,634 | 9/1969 | Pauletta | 422/174 X |
| 3,507,627 | 4/1970 | Frant et al. | 422/199 X |
| 3,907,423 | 9/1975 | Hayashi et al. | 118/262 X |
| 4,010,288 | 3/1977 | Souma | 355/10 X |

FOREIGN PATENT DOCUMENTS

| | | | |
|---|---|---|---|
| 2361833 | 9/1979 | Fed. Rep. of Germany . | |
| 53-66869 | 6/1978 | Japan | 422/174 |
| 7009301 | 1/1971 | Netherlands | 422/199 |

*Primary Examiner*—Richard L. Chiesa
*Attorney, Agent, or Firm*—Flynn, Thiel, Boutell & Tanis

[57] ABSTRACT

A process for treating exhaust gas from an electrophotographic machine which comprises oxidizing, in the presence of a heated oxidation catalyst, an odorous exhaust gas generated in course of the steps of developing an element being developed by means of a developer, transferring the thus developed image onto a transfer sheet and/or heating a copy material consisting of said element being developed or said transfer sheet thereby to make said exhaust gas odorless, and an apparatus therefor.

14 Claims, 4 Drawing Figures

TO THE OUTSIDE OF THE MACHINE

PROCESS FOR TREATING EXHAUST GAS FROM ELECTROPHOTOGRAPHIC MACHINE AND APPARATUS THEREOF

BACKGROUND OF THE INVENTION

1. Field of the Invention

The present invention relates to a process for treating exhaust gas generated within an electrophotographic machine which comprises making an odorous exhaust gas generated within the electrophotographic machine odorless, and an apparatus therefor.

2. Description of the Prior Art

Electrophotography is generally classified into wet and dry methods. In the former, a permanent image may be obtained through the steps of forming an electrostatic latent image on an image-bearing element such as a selenium electrophotographic element, a zinc oxide electrophotographic element or the like, developing the thus formed image with a liquid developer, transferring the developed image onto a transfer sheet as occasion demands, and thereafter heating and drying the developed or transferred image by means of a heating means such as heat roller or the like further as occasion demands. In the latter, on the other hand, a permanent image may be obtained through the steps of developing an electrostatic latent image formed in the same manner as described above with a powder developer (toner particles), transferring said image onto a transfer sheet as occasion demands, and thereafter thermally fixing the image by means of a heating means such as heat roller or the like. In addition, a method is also known which is designed to form an electrostatic latent image on an electrostatic recording element (which is also called a dielectric element) in place of an electrophotographic element. In this connection, it is to be noted that the electrophotographic element and electrostatic recording element shall hereinafter be called "an element being developed" respectively.

In the case of the wet method, an odorous solvent vapor-containing exhaust gas is discharged from a wet type electrophotographic machine utilizing this method, because the liquid developer used in the developing step contains a large quantity of solvent consisting essentially of a paraffinic or isoparaffinic hydrocarbon. This solvent vapor is caused mainly by evaporation of the solvent attached to the element being developed in the developing step or to the transfer sheet in the transferring step, but additionally by evaporation of the solvent attached to the developing unit or the like. This evaporation is more accelerated when the element being developed or transfer sheet is heated and dried in the drying step by means of a heating means.

Usually, such a solvent vapor-containing exhaust gas has been discharged to the outside of a machine without undergoing any treatment. Due to this, it has been called into question from the standpoint of environment sanitation that a small, especially confined room is filled with a high concentration of solvent gas in a short time in the cases of operating a machine at a high speed even when ventilating the room as well as operating the machine without ventilating the room. Therefore, various schemes to improve this problem have hitherto been proposed, for instance, (1) the use of a reversing squeeze roller for reducing the quantity of solvent attached to an element being developed and thereby suppressing the quantity of solvent vapor generated in the exhaust gas (which is disclosed, for instance, in U.S. Pat. No. 3,907,423 or German Pat. No. 2,361,833), (2) the introduction of exhaust gas (which has been collected by means of an air duct, this being applicable to the exhaust gas appearing hereinafter) to an adsorbent layer for allowing the gas to adsorb the solvent vapor, (3) the introduction of the exhaust gas into a high boiling solvent likewise for allowing said gas to adsorb the solvent vapor, (4) the passage of the exhaust gas through a condenser for removing a liquidified solvent vapor therefrom (which is disclosed, for instance, in U.S. Pat. No. 3,130,079), (5) the conversion of the solvent vapor contained in exhaust gas into a different substance through the reaction thereof with a reactive substance, and so forth. However, the scheme (1) still involves problems to be solved in image quality, that is, the resulting copy is of deteriorated image density and further the wide image area lacks the uniformity of image, the scheme (2) is defective in that the efficiency of adsorption is low, the scheme (3) is defective in that the efficiency of adsorption is more inferior than that of the scheme (2), the scheme (4) is defective in that the apparatus therefor becomes complicated and large-sized, which leads to high cost, and the scheme (5) has a problem to be solved in that a different odorous substance is created.

In the case of the dry method, on the other hand, an odorous gas is exhausted from an electrophotographic machine, too. The odorous substances contained in this exhaust gas, which are caused when the toner used is thermally fixed, are different in composition from those of the exhaust gas from the wet type electrophotographic machine, and in more detail comprise those generated from the toner particles and the electrophotographic element-constituting materials (various kinds of resins), for instance, such as the residual solvent, unreacted monomer and its decomposition gas and remaining solvent contained in the material resins and additionally those generated from the material constituting the surface of the heat roller (silicone resin), for instance, such as the remaining polymerization catalyst, silicone oil and the like. In either case, it is noted that these odorous substances are generated in a marked degree when using high-speed electrophotographic machines, in particular those wherein flash fixing is employed. In order to overcome the exhaust gases from these dry type electrophotographic machines, however, scarcely any counterplan has hitherto been considered likewise in the cases of wet type electrophotographic machines. The fact is that for that purpose there has only been proposed the adsorption method as described in the preceding (2) wherein active carbon is employed as an adsorbent. However, this method is defective in that because the active carbon has a short adsorbent life it will have to be exchanged earlier than usual and further that since air ducts required for collecting exhaust gases become large-sized electrophotographic machines per se will consequently have to become large-sized.

SUMMARY OF THE INVENTION

It is an object of the present invention to provide a process for treating exhaust gas generated within an electrophotographic machine and an apparatus therefor, wherein an odorous solvent gas generated within a wet type electrophotographic machine is decomposed by means of a catalyst into an odorless substance and thus high-speed copying can be effected without causing any odious smell.

It is another object of the present invention to provide a process for treating exhaust gas generated within an electrophotographic machine and an apparatus therefor, wherein there is no necessity for any limitation on the quantity of developer attached to an element being developed in a wet type electrophotographic machine.

It is a further object of the present invention to provide a process for economically treating exhaust gas generated within an electrophotographic machine and an apparatus therefor wherein an odorous solvent gas generated within a wet type electrophotographic machine can be converted into an odorless substance efficiently by means of a simple as well as small-sized apparatus.

It is a still further object of the present invention to provide a process for treating exhaust gas generated within an electrophotographic machine and an apparatus therefor which is capable of rendering an odorous exhaust gas generated within a dry electrophotographic machine odorless in a short time as well as without using an enlarged apparatus.

In other words, the process according to the present invention is characterized in that an odorous exhaust gas generated in the course of the steps of developing an image on an element being developed by means of a developer, transferring the thus developed image onto a transfer sheet and/or heating a copy material consisting of said element being developed or said transfer sheet is contacted with a heated oxidation catalyst for oxidizing treatment and is made odorless.

On the other hand, the apparatus according to the present invention is characterized by the combination of an oxidation catalyst bed, which functions to oxidize an odorous exhaust gas generated within a unit for developing an image on an element being developed by means of a developer, a unit for transferring the thus developed image onto a transfer sheet and/or a unit for heating a copy material consisting of said element being developed or said transfer sheet and thus to destroy the odor of said exhaust gas, with a means for heating said bed.

According to the present invention, an odorous gas such as solvent gas or the like generated within a wet or dry type electrophotographic machine can be decomposed into an odorless substance. Accordingly, the exhaust gas treated by means of the process or apparatus according to the present invention can itself be discharged into the room or the air.

Figure 1:
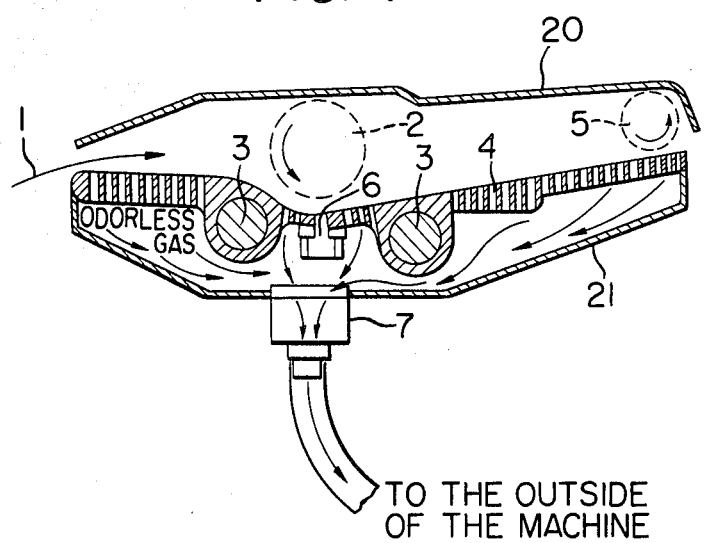
FIGS. 1 to 2 each illustrate one embodiment of the treating apparatus according to the present invention which is incorporated in the drying unit of a wet type electrophotographic machine or combined with said unit.

1 . . . copy material; 2 . . . guide roller
3,3' . . . heater; 4,4' . . . catalyst bed
5 . . . roller for preventing the flow out of generated gas and conveying a copy material
6 . . . thermistor; 7 . . . suction pump
8 . . . conveying belt; 9 . . . conveying roller
10 . . . roller for heat fixing and conveying a copy material
11 . . . reflector; 12 . . . flash lamp
20,21,22,23,24,25,26,27,28,29 . . . cover

DESCRIPTION OF THE PREFERRED EMBODIMENTS

The process according to the present invention is carried out in the presence of a heated catalyst. The heated catalyst is preferred to have a temperature in the range of from about 150° C. to about 350° C. which is equal to that of the element being developed or transfer sheet in the heating step, namely, the drying or heat fixing step.

The catalyst must be heated so that it may be activated. As the heating system for the catalyst, there may be employed any one of the inside and outside heating systems. It goes without saying that the process according to the present invention is applicable to electrophotographic machines not only having a drying or heat fixing unit but also lacking a drying or heat fixing unit. However, when the present process is applied to the former machine, it is preferable that at least a part of the heat present in the drying or heat fixing unit should be utilized for the purpose of heating the catalyst (in case where said "at least a part" of the heat is replaced by "the whole" thereof, it means that one and the same, namely, common heat source is utilized for the double purpose of drying or fixing a copy material and heating a catalyst). In this case, the process according to the present invention is performed in an appendant manner in the course of the drying or fixing step. In case where this machine is a wet type electrophotographic machine, it is preferable that at least a part of the heat for use in heating the catalyst should be utilized for the purpose of drying a copy material leaving the machine because said copy material is still remaining wet.

The oxidation catalysts employed effectively in the present invention include $Mn_2O_3$-$Co_3O_4$, $Mn_2O_3$-NiO, $Mn_2O_3$-$Fe_2O_3$, $Mn_2O_3$-CuO, $Mn_2O_3$-ZnO, NiO-$\gamma$-$Al_2O_3$, NiO-$SiO_2$, $NiO_2$-$SiO_2$, $V_2O_3$-$Al_2O_3$, $Cr_2O_3$-$\gamma$-$Al_2O_3$, $Cr_3O_4$-$\gamma$-$Al_2O_3$, $Co_3O_4$-$\gamma$-$Al_2O_3$, $Mn_2O_3$-$\gamma$-$Al_2O_3$, Pt-$\gamma$-$Al_2O_3$, NiO-$Cr_2O_3$, ZnO-$Cr_2O_3$, $Co_3O_4$-CuO, Pd-$\gamma$-$Al_2O_3$, $Cu_2Cr_2O_5$-$\gamma$-$Al_2O_3$, NiO-Pd, $Co_3O_4$, $Mn_2O_3$, $Cr_2O_3$, NiO, $Fe_2O_3$, $TiO_2$, $MoO_2$, PbO, ZnO, etc. These catalysts, when used, are carried on normal carriers such as alumina, silica, diatom earth, clay and the like. With reference to the configuration of catalysts there is no specific limitation, but the catalysts used are normally of a honey-comb construction.

Figure 2:
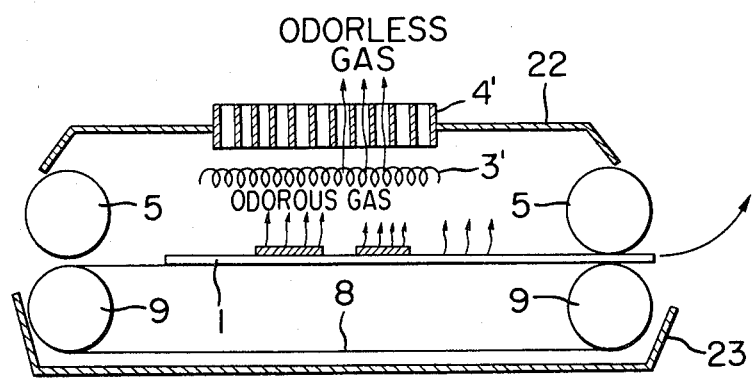

Next, explanation will be made on the exhaust gas treating apparatus for use in the process according to the present invention. FIGS. 1 to 2 each illustrate one embodiment of the apparatuses suitable for treating exhaust gases generated within wet type electrophotographic machines (which may have a drying unit or not), in particular such as solvent vapor. The apparatuses illustrated in FIGS. 1 and 2 are both usable in combination with a drying structure. In the case of the apparatus illustrated in FIG. 1, however, it is so constructed that a catalyst bed 4 accommodating a heater 3 (the said catalyst bed herein has a porous honey-comb construction) is employed as a substitute for the portion corresponding to the hot plate normally used in the drying unit. In FIG. 1, a copy material 1 introduced into the apparatus by means of a guide roller 2 from a transferring or developing unit (not shown) is heated by a heater 3 and a catalyst bed 4 heated by this heater 3 and is dried. The solvent vapor generated at this time is sucked, if needed, together with the solvent vapor arising from the transferring unit and/or the developing unit by means of a suction pump 7 disposed downstream of the catalyst bed 4 and enters this bed 4, whereby it is allowed to contact with the catalyst effectively. Since the catalyst within this catalyst bed has previously been heated and activated, the solvent vapor, directly upon contacting with said catalyst, is decomposed into an odorless substance. In this connection, it is to be noted that numeral 5 denotes a roller for preventing the flow out of generated gas and conveying a copy material, numeral 6 denotes a thermistor and numerals 20, 21 denote each a cover for preventing the flow out of exhaust gas. The apparatus illustrated in FIG. 1, as mentioned above, is provided with the pump 7 for sucking in the exhaust gas. Referring to the apparatus illustrated in FIG. 2, its construction is similar to that of the apparatus illustrated in FIG. 1 in that a catalyst bed 4' arranged to be heated by an outside heater 3' is employed as a substitute for the hot plate normally used in the drying unit, but is distinguished from the apparatus illustrated in FIG. 1 by the absence of a suction pump. Accordingly, the apparatus illustrated in FIG. 2 is designed so that the solvent vapor generated by heating is allowed to contact with a catalyst 4' spontaneously by the aid of its own buoyancy, pass through it and is discharged to the outside of the machine. In this connection, it is to be noted that the apparatus illustrated in FIG. 2, which is designed to heat the catalyst by means of the outside heater, can exhibit a superior thermal efficiency in the catalyst bed as compared with the apparatus illustrated in FIG. 1. The reason is that according to the former apparatus the catalyst bed 4' can also be heated, and further the odorous gas generated from the copy material can be heated again by the heater 3' while reaching the catalyst bed and thereafter is allowed to enter the catalyst bed. In addition, it is to be noted that numeral 8 denotes a belt for conveying the copy material, numeral 9 denotes a conveying roller, and numerals 22 and 23 denote covers respectively. As mentioned above, the apparatuses illustrated in FIGS. 1 to 2 are each of the type which utilizes a common heat source for the purposes of heating and drying the catalyst.

Figure 3:
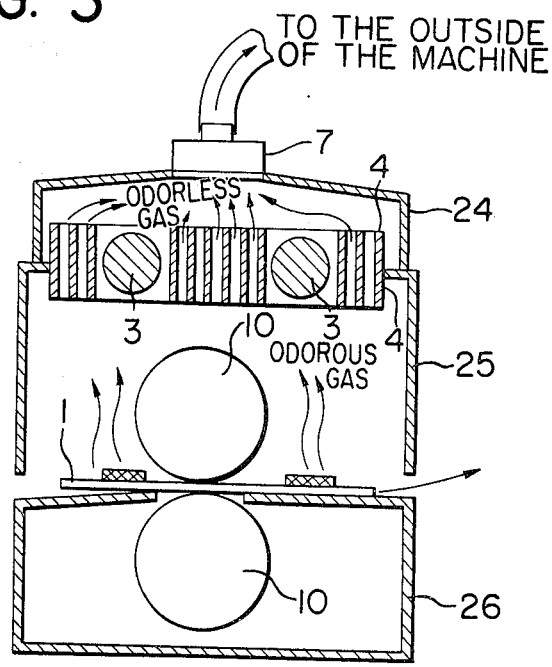
FIGS. 3 to 4 each illustrate one embodiment of the treating apparatus according to the present invention incorporated in the fixing unit of a dry type electrophotographic machine. In the drawings, the reference numbers identify the parts as follows.
Figure 4:
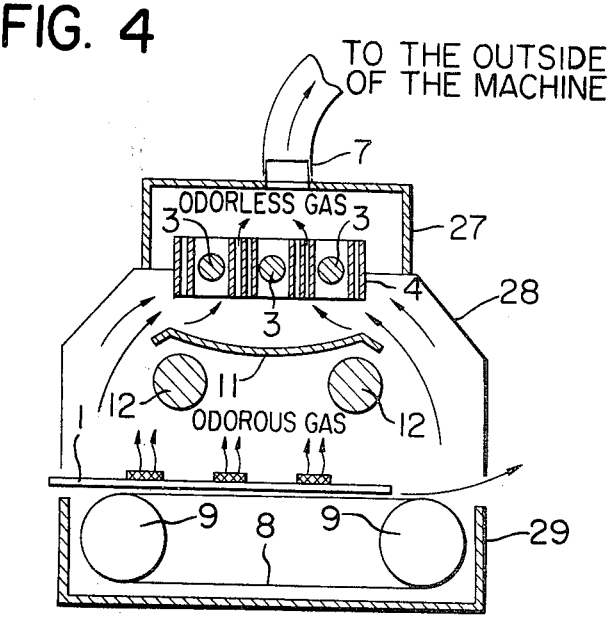

On the other hand, FIGS. 3 to 4 illustrate each one embodiment of the apparatuses suitable for treating exhaust gases generated within dry type electrophotographic machines. The apparatus illustrated in FIG. 3 is used in combination with a heat roller type fixing unit, while the apparatus illustrated in FIG. 4 is used in combination with a flash type fixing unit. Accordingly, the apparatus illustrated in FIG. 3 is generally used in a normal speed dry type electrophotographic machine, while the apparatus illustrated in FIG. 4 is used in a high speed dry type electrophotographic machine. In FIGS. 3 and 4, numeral 10 denotes a roller for heat fixing and conveying a copy material, numeral 11 denotes a reflector, numeral 12 denotes a flash lamp, and numerals 24, 25, 26, 27, 28 and 29 denote covers respectively. The apparatus as illustrated in FIG. 2 is not always in need of the suction pump 7, because such apparatus is designed so that the odorous gas is allowed to enter the catalyst bed spontaneously by the aid of its own buoyancy. Referring to the reflector 11, it is a means surely suitable for heating the copy material uniformly, but it is not always required in case where a small copy material is heated or the like.

When the apparatus according to the present invention is incorporated in a normal wet or dry type electrophotographic machine, this apparatus is disposed between the source of odorous gas such as the developing unit, transferring unit and/or heating unit (drying unit or heat fixing unit) and the exhaust port for the air within the machine.

EXAMPLE 1

Copying was conducted for 20 minutes continuously within a 25 m$^3$ non-ventilated confined room maintained at 22° C.-65% RH atmospheric conditions by means of a commercially available wet type electrophotographic machine incorporated therein the apparatus illustrated in FIG. 1 (the heater of which was set to have a temperature of 200°±10° C.) using a $Mn_2O_3$-ZnO-Alumina catalyst. The quantity of solvent exhausted within the room was thus measured to be such a very small one as 25 ppm. The good results were obtained likewise in case where silica, diatom earth and clay were used respectively as catalytic carriers in place of alumina. The solvent used herein is an isoparaffinic hydrocarbon solvent having a boiling point ranging from 174° C. to 180° C.

On the other hand, when copying was conducted by means of a conventional wet type electrophotographic machine free from aforesaid treating apparatus, the quantity of solvent exhausted within the room was measured to be such a very large one as 200 ppm.

EXAMPLE 2

The same procedure as Example 1 was repeated by using a $Mn_2O_3$-$Fe_2O_3$-alumina catalyst to find that the quantity of solvent exhausted within the room was very small, namely, 10 ppm. The good results were obtained likewise in case where silica, diatom earth and clay were used respectively as catalytic carriers.

EXAMPLES 3-7

The same procedure as Example 1 was repeated by using the catalysts as shown in the following table respectively. The obtained results are shown in the table. For comparison sake, the result obtained in accordance with the conventional process is also incorporated therein.

| | Catalytic construction | Quantity of solvent (ppm) |
|---|---|---|
| Example 3 | NiO—Pd—Alumina | 25 |
| Example 4 | $Cu_2Cr_2O_5$—$\gamma$-$Al_2O_3$—diatom earth | 15 |
| Example 5 | $Mn_2O_3$—CuO—Alumina | 30 |
| Example 6 | Pt—$\gamma$-$Al_2O_3$—diatom earth | 65* |
| Example 7 | $Co_3O_4$—$\gamma$-$Al_2O_3$—diatom earth | 105* |
| Conventional process | — | 200 |

*denotes an isoparaffinic hydrocarbon solvent having a boiling point ranging from 161° C. to 173° C.

EXAMPLE 8

Copying was conducted for 20 minutes continuously within a room of the same conditions as Example 1 by means a commercially available dry type electrophotographic machine (the fixing structure of which is the roller type) incorporated therein the apparatus illustrated in FIG. 3 (the heater of which was set to have a temperature of 200°±10° C.) using a $Mn_2O_3$-ZnO- Alumina catalyst, but no foul odor was emitted within the room.

In contrast, when copying was conducted by means of the conventional dry type electrophotographc machine (the fixing structure of which is the roller type) free from aforesaid apparatus a considerable foul odor was emitted within the room, producing an unpleasant feeling.

EXAMPLES 9-14

The same procedure as Example 8 was repeated by using the catalysts as shown in Examples 2-7 respectively with the result that no foul odor was emitted likewise in the case of Example 8.

EXAMPLE 15

Copying was conducted for 20 minutes continuously within a room of the same conditions as Example 1 by means of a commercially available dry type electrophotographic machine (the fixing structure of which is the flash type) incorporated therein the apparatus illustrated in FIG. 4 (the heater of which was set to have a temperature of 200°±10° C.) using a $Mn_2O_3$-ZnO-Alumina catalyst, but no foul odor was emitted within the room.

In contrast, when copying was conducted by means of the conventional dry type electrophotographic machine (the fixing structure of which is the flash type) free from aforesaid apparatus, a considerable foul odor was emitted within the room, producing an unpleasant feeling.

EXAMPLES 16-21

The same procedure as Example 15 was repeated by using the catalysts as shown in Examples 2-7 respectively with the result that no foul odor was emitted likewise in the case of Example 15.

What is claimed is:

1. A process for treating an odorous exhaust gas which is generated during an electrophotography process, which comprises: forwarding an electrophotographic copy material bearing developer thereon through a heating zone and therein heating said copy material by a heater to dry or fix said developer on said copy material; contacting said odorous exhaust gas in said heating zone with a heated oxidation catalyst effective for converting said odorous exhaust gas to a substantially odorless gas, and simultaneously directly heating said oxidation catalyst with at least a portion of the heat supplied by said heater so that said heater is employed for both drying or fixing the developer and for heating said catalyst.

2. A process as claimed in claim 1 wherein the heating of said copy material is effected by means of the heat from said heater in combination with the heat from said heated catalyst.

3. A process as claimed in claim 1 wherein the heating of said catalyst is effected at a temperature in the range of from 150° C. to 350° C.

4. A process as claimed in claim 1 wherein the source of the odorous exhaust gas is a solvent.

5. A process as claimed in claim 1 wherein the catalyst is of a porous honeycomb construction.

6. A process as claimed in claim 1 wherein the exhaust gas is drawn into the catalyst and flowed therethrough forceably by suction.

7. A process for treating an odorous exhaust gas which is generated during an electrophotography process, which comprises: moving an electrophotographic copy sheet bearing developer thereon across the surface of an internally heated plate located within an enclosure for containing said exhaust gas, said plate having internal heating means therein and comprising at least one porous, honeycomb section containing an oxidation catalyst, and thereby heating said copy sheet to dry or fix said developer thereon and simultaneously directly heating said oxidation catalyst by said internal heating means to a temperature at which said catalyst is effective for converting said odorous exhaust gas to a substantially odorless gas, and drawing said odorous exhaust gas through said porous honeycomb section of said plate to contact said odorous exhaust gas with said heated catalyst whereby to convert said odorous exhaust gas to a substantially odorless gas and then discharging said substantially odorless gas from said enclosure.

8. A process as claimed in claim 7 in which said plate, including said catalyst, is heated to a temperature of from 150° to 350° C.

9. An apparatus for treating an odorous exhaust gas which is generated during an electrophotography process, which comprises: means defining an enclosed heating zone containing a bed of oxidation catalyst and a heater in direct heat exchange relationship with said oxidation catalyst bed, said oxidation catalyst being effective, when heated, to convert said odorous exhaust gas to a substantially odorless gas, and means for forwarding an electrophotographic copy material bearing developer thereon through said heating zone so that said copy material is heated by said heater to dry or fix said developer on said copy material and said heater is simultaneously effective to directly heat said catalyst bed.

10. An apparatus as claimed in claim 9 further including a suction means adapted for causing the odorous exhaust gas to flow into and pass through said catalyst bed.

11. An apparatus as claimed in claim 9 wherein said catalyst bed is of a porous honeycomb construction.

12. An apparatus as claimed in claim 9 in which said heating zone contains therein an elongated plate having internal heating means therein and comprising at least one porous honeycomb section containing said catalyst, means for feeding an electrophotographic copy sheet bearing developer thereon across the surface of said plate, said internal heating means in said plate being effective to heat said copy sheet to dry or fix said developer thereon and also being effective to directly heat said oxidation catalyst to a temperature at which said catalyst is effective to convert said odorous exhaust gas to a substantially odorless gas, and suction means for drawing said odorous exhaust gas through said porous honeycomb section of said plate.

13. An apparatus as claimed in claim 12 wherein said plate has a plurality of heaters therein which are spaced apart from each other along the lengthwise extent of said plate and including a plurality of said porous honeycomb sections, a cover defining an enclosed suction zone below said plate for confining the gas after it has passed through said honeycomb sections and a duct extending from said enclosed suction zone for discharging the gas.

14. An apparatus as claimed in claim 13 including roller means disposed above said surface of said plate for moving copy sheets across said surface of said plate and a second cover overlying said roller means and adapted for containing said odorous exhaust gas, said second cover including opening means for permitting copy sheets to enter and leave said heating zone at opposite ends thereof.

* * * * *

UNITED STATES PATENT AND TRADEMARK OFFICE
CERTIFICATE OF CORRECTION

PATENT NO. : 4 415 533
DATED : November 15, 1983
INVENTOR(S) : Tsuneo Kurotori et al It is certified that error appears in the above-identified patent and that said Letters Patent is hereby corrected as shown below:

On the title page, at item 54, change the title to read as follows:

---PROCESS FOR TREATING EXHAUST GAS FROM ELECTROPHOTOGRAPHIC MACHINE AND APPARATUS THEREFOR---.

On the title page, at item 30 and below "Foreign Application Priority Data", change to read as follows:

---Jun. 19, 1980 [JP] Japan........55-83374---.

Signed and Sealed this

First Day of May 1984

[SEAL]

Attest:

GERALD J. MOSSINGHOFF

Attesting Officer

Commissioner of Patents and Trademarks